United States Patent [19]
Centafanti

[11] Patent Number: 4,829,709
[45] Date of Patent: May 16, 1989

[54] SELF-WATERING FLOWER POT

[76] Inventor: Rocco Centafanti, 27 India St., Portland, Me. 04101

[21] Appl. No.: 116,495

[22] Filed: Nov. 4, 1987

Related U.S. Application Data

[63] Continuation-in-part of Ser. No. 933,238, Nov. 21, 1986, abandoned.

[51] Int. Cl.[4] .......................................... A01G 27/00
[52] U.S. Cl. ........................................ 47/79; 47/81; 47/82
[58] Field of Search ........................ 47/79, 80, 81, 82

[56] References Cited

U.S. PATENT DOCUMENTS

| | | | |
|---|---|---|---|
| 681,672 | 9/1901 | Andrews | 47/80 |
| 1,108,334 | 8/1914 | Carr | 47/80 |
| 1,450,633 | 4/1923 | Hudson | 47/81 |
| 2,253,469 | 8/1941 | Markley | 47/80 |
| 2,638,716 | 5/1953 | Luipersbek | 47/79 |
| 2,691,245 | 10/1954 | Yohe | 47/81 |
| 3,063,196 | 11/1962 | Pauer | 47/82 |
| 3,069,807 | 12/1962 | Wall | 47/81 |
| 3,220,144 | 11/1965 | Green | 47/80 |
| 3,958,366 | 5/1976 | Meyers | 47/81 |
| 4,231,187 | 11/1980 | Greenbaum | 47/81 X |
| 4,236,352 | 12/1980 | Heaney et al. | 47/80 |
| 4,324,070 | 4/1982 | Swisher | 47/81 |

FOREIGN PATENT DOCUMENTS

| | | | |
|---|---|---|---|
| 4005 | 1/1901 | Fed. Rep. of Germany | 47/80 |
| 3440616 | 5/1986 | Fed. Rep. of Germany | 47/81 |
| 453258 | 6/1913 | France | 47/81 |
| 17093 | 6/1913 | France | 47/80 |
| 579120 | 10/1924 | France | 47/81 |
| 1024483 | 4/1953 | France | 47/80 |
| 1263364 | of 1961 | France | 47/80 |
| 1393533 | 2/1965 | France | 47/81 |
| 12057 | 7/1896 | Italy | 47/81 |
| 274148 | 3/1951 | Switzerland | 47/80 |
| 291411 | 6/1953 | Switzerland | . |
| 342030 | 12/1959 | Switzerland | 47/81 |
| 342027 | 12/1959 | Switzerland | 47/81 |
| 466630 | 1/1969 | Switzerland | 47/80 |
| 403460 | 12/1933 | United Kingdom | 47/79 |
| 654013 | 5/1951 | United Kingdom | 47/81 |
| 1200457 | 7/1970 | United Kingdom | 47/81 |
| 2045043 | 10/1980 | United Kingdom | 47/81 |

*Primary Examiner*—Richard J. Johnson
*Assistant Examiner*—Kevin G. Rooney

[57] ABSTRACT

A self-supporting plant container has at least one plant receptacle supported by and covering a lower receptacle which is a reservoir. An irrigating device effects communication between the receptacles and consists of a wick element extending into both receptacles and a perforated tube secured to the bottom of the upper receptacle and extending at least upwardly therein and therein confining the wick member. The wick member is self-supporting when dry and a snug fit in the tube at least when saturated.

3 Claims, 5 Drawing Sheets

U.S. Patent   May 16, 1989   Sheet 1 of 5   4,829,709
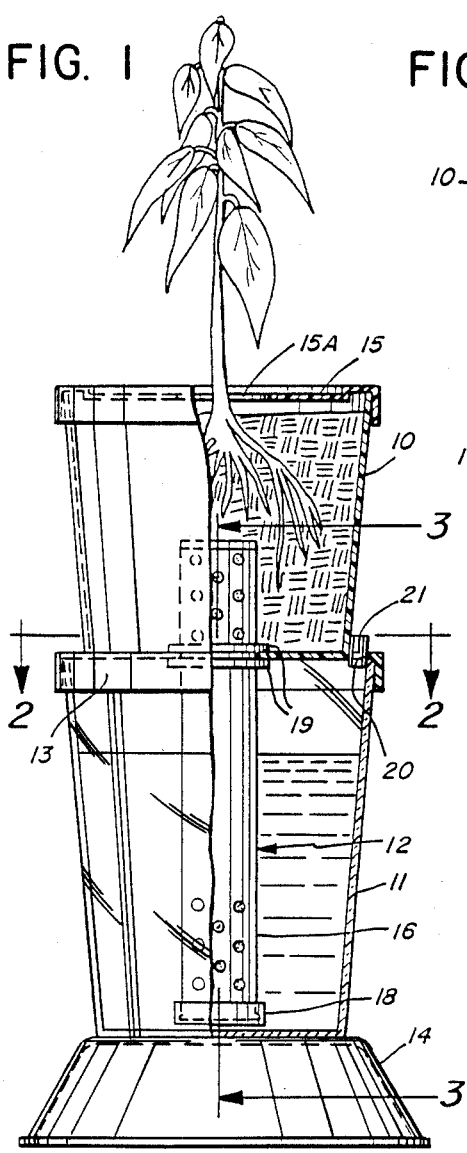
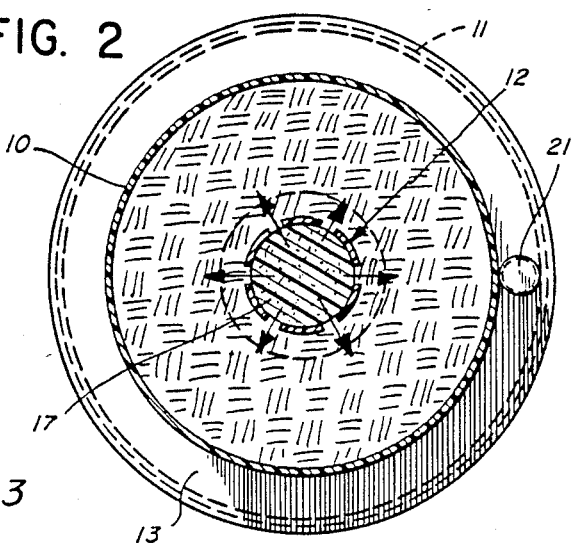
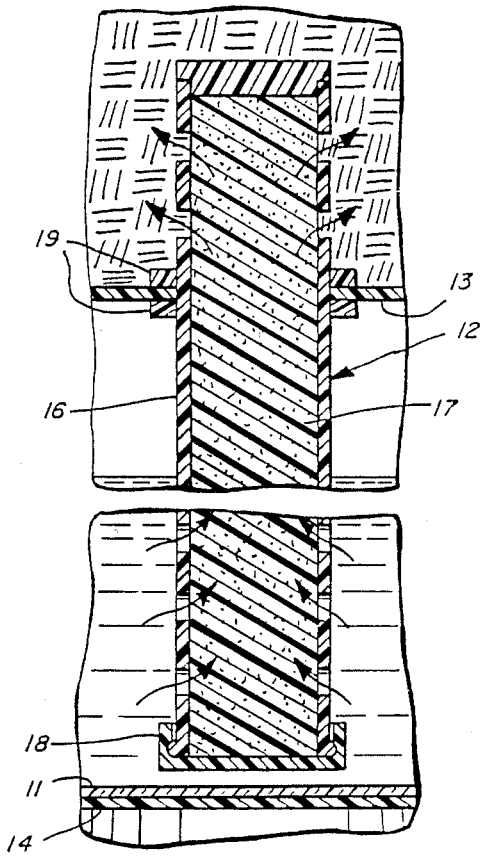

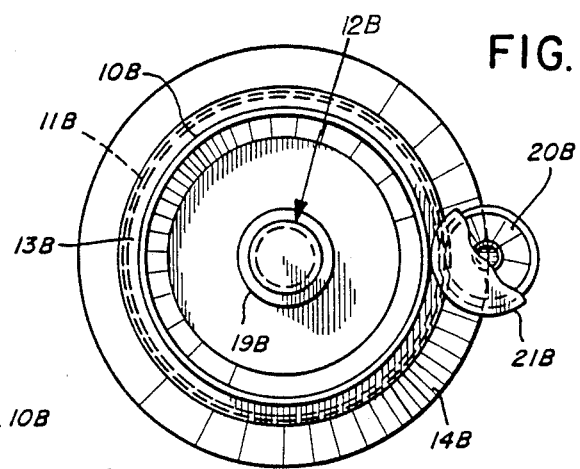
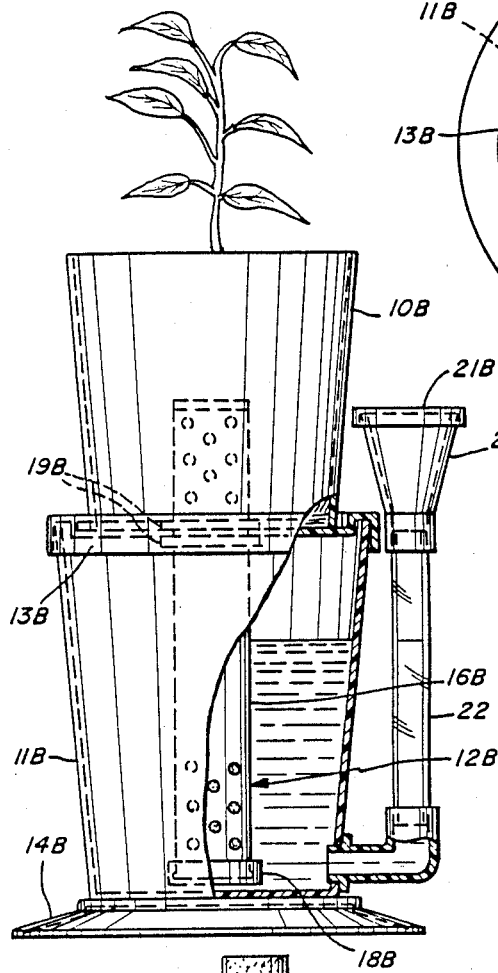
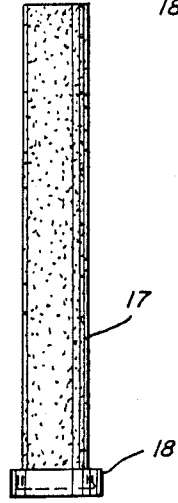
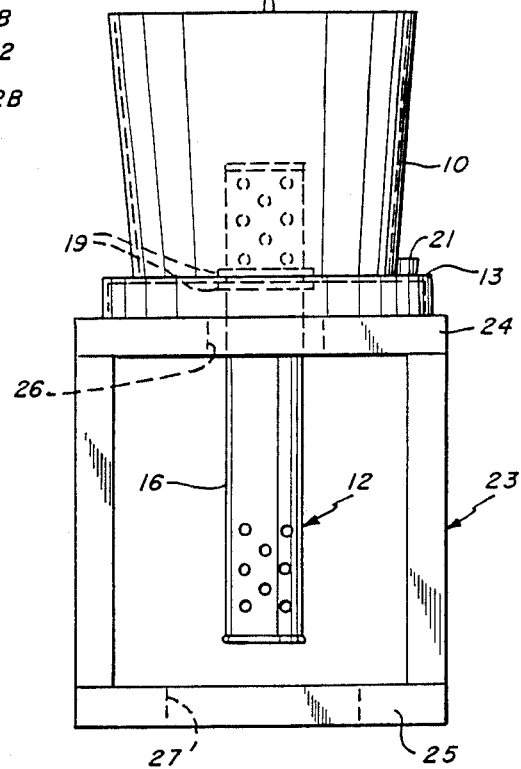
FIG. 7
FIG. 8
FIG. 9
FIG. 10

SELF-WATERING FLOWER POT

This application is a continuation-in-part of Ser. No. 933,238, filed Nov. 21, 1986, now abandoned.

BACKGROUND OF THE INVENTION

Plants, both ornamental and seedlings later to be transplanted outside, are widely grown indoors. Such plants are commonly started in or transplanted to pots which are available in various sizes and shapes and which typically have a drain hole in their bottoms.

Regular and frequent watering of the plants is required to ensure proper growth and to maintain plant health. When water is applied to the surface of the soil in such a pot, particularly when the surface thereof is concealed by foliage, it is difficult to determine whether the soil has been moistened to a depth ensuring root development and nourishment.

It has long been recognized that it is advantageous to place a pot in water and permit the soil to absorb water through the hole in the bottom thereof, a procedure that is time consuming. As a consequence, it is the usual practice to employ a watering pot to apply water to the several plant-containing pots on a regular and frequent basis.

In order to lessen the frequency of such a watering procedure and in recognition of the drawbacks thereof, proposals have been made to combine such pots with a bottom receptacle dimensioned to contain a substantial volume of water. A wick extends from the reservoir into the dirt thus to deliver water thereto by capillary attraction.

As far as I am aware, such proposals have not been accepted and such self-watering systems that are used have wicks free in the flower pots and once embedded in the soil were not capable of ensuring that the moisture carried thereby was uniformly and effectively distributed.

THE PRESENT INVENTION

The general objective of the present invention is to provide plant containers in which the soil in each plant-containing upper receptacle is properly irrigated by water from the subjacent receptacle which serves as a reservoir.

In accordance with the invention, this objective is attained by employing an irrigating device extending into both receptacles to effect communication between them. The device consists of a wick member which is self-supporting, at least when dry, and a tube in which the wick member is a snug fit, at least when saturated. The tube is perforated and extends the full length of at least that portion of the wick member that is within the upper receptacle and is connected to the bottom thereof. The tube may and in some embodiments of the invention does extend into the bottom receptacle.

Another aspect of the invention is that the plant receptacle constitutes the covers of the reservoirs. The reservoirs may be translucent thus to show the water level or they may may be opaque in which case they are provided with a combined sight glass showing water levels and preferably serving as a tube for use in adding water to the reservoir.

Other objectives of the invention and the manner of their attainment will be apparent from the accompanying drawings, specification and appended claims.

BRIEF DESCRIPTION OF THE DRAWINGS

The accompanying drawings illustrate preferred embodiments of the invention of which:

FIG. 1 is a partly sectioned side view of a plant container the reservoir of which is translucent;

FIG. 2 is a section, on an increase in scale, taken approximately along the indicated line 2—2 of FIG. 1;

FIG. 3 is a section, also on an increase in scale, taken approximately along the indicated line 3—3 of FIG. 1;

FIG. 7 is a partly sectioned side view of a plant container the reservoir of which is opaque;

FIG. 8 is a top plan view thereof;

FIG. 9 is a side view of a wick element with a tube cap secured to one end thereof;

FIG. 10 is an end view of a stand in support of a plant receptacle;

THE PREFERRED EMBODIMENTS OF THE INVENTION

Figure 4:
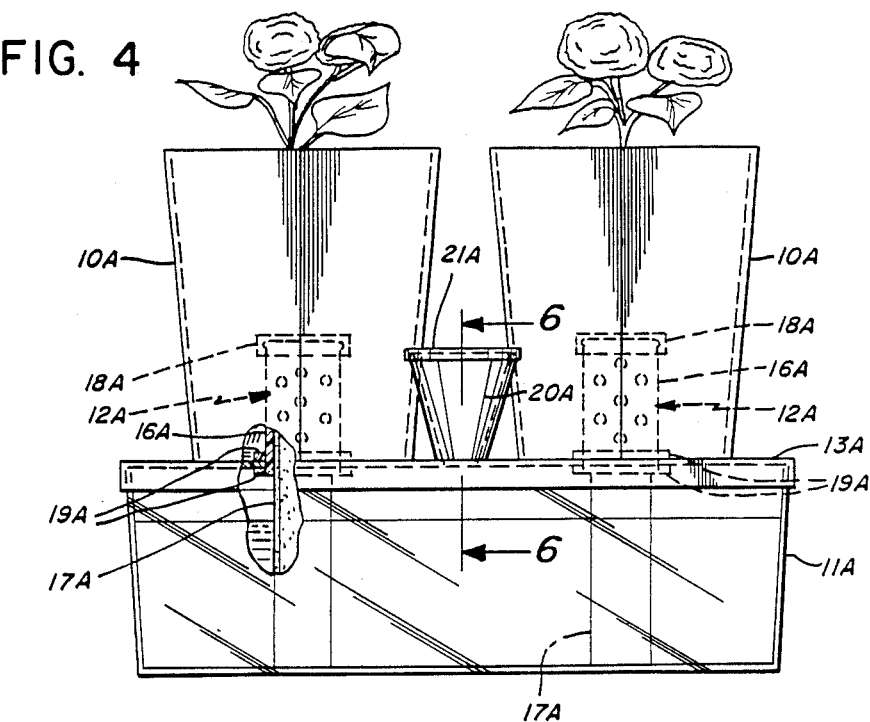
FIG. 4 is a front view of a plant container in which the reservoir is common to two plant receptacles.

The self-watering plant container illustrated by FIGS. 1-3 consists of an upper receptacle 10 for dirt and a plant or plants, a bottom receptacle 11 in support thereof and which is a reservoir and an irrigating device, generally indicated at 12, effecting communication between them. A cover 13 closes the reservoir 11 and is an integral part of the bottom of the upper receptacle 10. The reservoir 11 is shown as provided with a base 14 to ensure stability. In FIG. 1, the upper receptacle 10 has a cover 15 having a central opening 15A for plants and serving to substantially reduce the amount of dirt directly exposed to the air. The surface of the cover 15 also serves as a reflector.

The irrigating device 12 consists of a tube 16 having perforations spaced along its length and a wick element 17 within the tube. The wick element is self-supporting, a least when dry and extends from end-to-end of the tube. The wick element 17 may be and preferably is of cellulose sponge material. An end cap 18 is detachably attached to the bottom end of the tube 16 and the wick element may be attached thereto or it may be separate therefrom. As the upper end of a device 12 is typically but not necessarily below the surface of the dirt, the upper end of the tube 16 thereof is closed. The length of the device 12 in the upper receptacle 10 is typically approximately one-half the height thereof. The tube of the device 12 is sealed as at 19 to the bottom of the upper receptacle and while the tube may be perforated uniformly throughout its length, it is preferred that the perforations be confined to the lower portion of the section thereof within the reservoir 11 and extend throughout the entire length of the tube which is in the upper receptacle 10.

The size and shape of the bottom receptacle 11 may vary as long as its volumetric capacity is such as to ensure a long interval in which proper irrigation of the plant or plants is provided. While the length of the time for which a given volume of water will be adequate for irrigating purposes depends on such varying factors as the size and kind of plant, room temperature and the relative humidity of the air therein and the location of the plant relative to windows, a quart of water per plant will provide irrigation for at least one month. It is preferred, however, that reservoir capacities be substantially larger.

While the reservoir 11 is exposed by removing the upper receptacle 10 so that it may be filled and cleaned, it is preferred that the reservoir cover 13 be provided with a filler port 20 closed by a plug 21 which may be removed when water is to be added. If the reservoir 11 is, as shown, of a translucent material, when water is to be added, is easily determined. It will be appreciated that water soluble plant nutrients are usually added to the water in amounts appropriate for the plant and the volume of water being introduced into the reservoir 11. In use, with the reservoir 11 filled with water to the desired extent and the upper receptacle 10 is provided with an adequate supply of dirt for the plant or plants therein, the wick element 16 is effective in transferring water by capillary attraction from the reservoir to the dirt. It should be noted that the wick element 17, when dry, is so dimensioned as to fit the tube 16. It need not be, however, a snug fit as, when it is wet, it so swells that surface portions fill the tube perforations ensuring the wetting of the surrounding dirt. Soil in the upper receptacle 10 is maintained suitably moist with the tubes 16 of the irrigating devices one inch in diameter with receptacles the dimensions used for flower pots.

Figure 5:
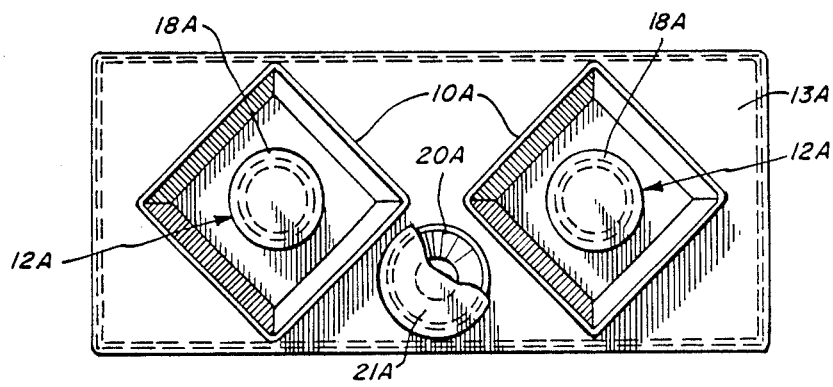
FIG. 5 is a plan view of the plant container of FIG. 4.
Figure 6:
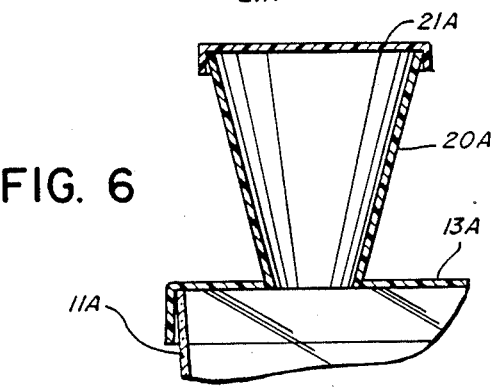
FIG. 6 is a section, on an increase in scale, taken approximately along the indicated line 6—6 of FIG. 4.

The embodiment of the invention illustrated by FIGS. 4-6 is generally similar to that of FIGS. 1-3. Accordingly, corresponding parts will not again be described and are identified by the same reference numerals which are distinguished by the suffix addition A. Important differences are that the reservoir 11A is so dimensioned that it serves two upper receptacles 10 and the tubes 16A of the irrigating devices 12A do not extend downwardly into the reservoir 11A while the lower ends of the wick elements 17A rest on the bottom thereof. The tubes 16A are open ended and each wick element 17A is secured at one end to a cap 18A closing the upper tube end. The two receptacles 10A provide the cover for the reservoir 11A and it is shown as common to both of them.

The reservoir 11A is so dimensioned that the filler port 20A may be in the form of a funnel and located between the receptacle 10A adjacent a side edge of the reservoir and closed by a cap 21A.

The embodiment of the invention illustrated by FIGS. 7 and 8 is also generally similar to that shown in FIGS. 1-3 and its corresponding parts are indicated by the same reference numerals distinguished by the suffix addition B. In this embodiment, the reservoir 11B is formed by opaque material and is provided with a transparent signal or level tube 22 having a funnel 20B at its upper end closed by a cap 21B.

Figure 11:
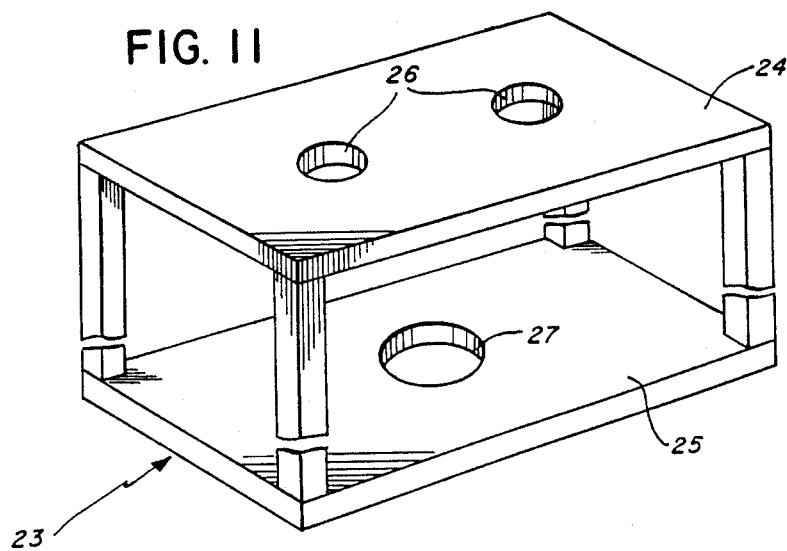
FIG. 11 is a view in perspective, of the holder by itself.

From the foregoing, it will be apparent that the invention ensures the proper irrigation of plants for long intervals without the frequent watering now required. As servicing such as cleaning the reservoirs and the wick elements or the replacement of the latter may occasionally be required, a stand, generally indicated at 23 and illustrated by FIGS. 10 and 11 is provided to support the plant containing receptacles when separated from their reservoirs.

The upper surface 24 of the stand 23 has holes 26 to accommodate the depending tubes or the wick elements of two upper receptacles while the lower surface 25 has a central hole 27 of a somewhat larger size as large sized receptacles may have irrigating devices of larger cross sectional area than those used for upper receptacles within the dimensions of which are within those more commonly used. The dimensions of such holes is not critical other than that they may be easily located within an upper receptacle that is to be placed on the stand and that their lateral movement be then limited.

Figure 12:
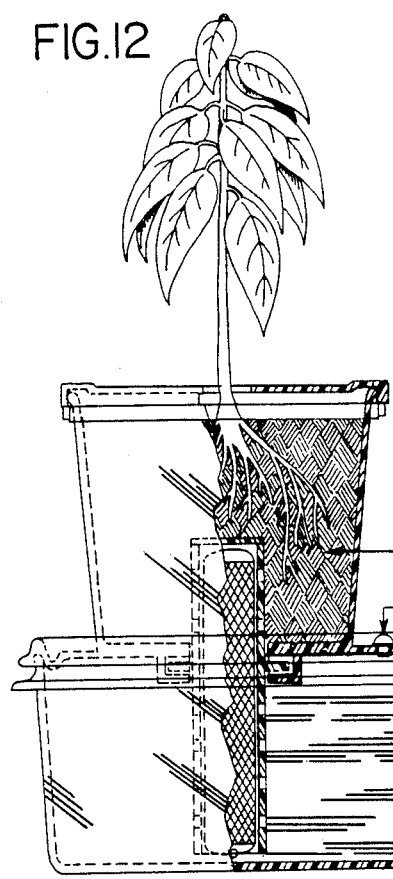
FIG. 12 is a partly sectioned side view of a self-watering plant container in accordance with another embodiment of the invention.
Figure 13:
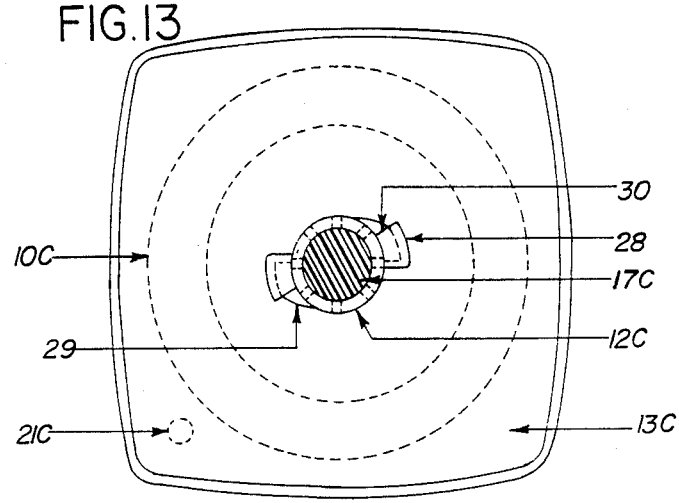
FIG. 13 is a section taken transversely of the bottom of the upper receptacle.
Figure 14:
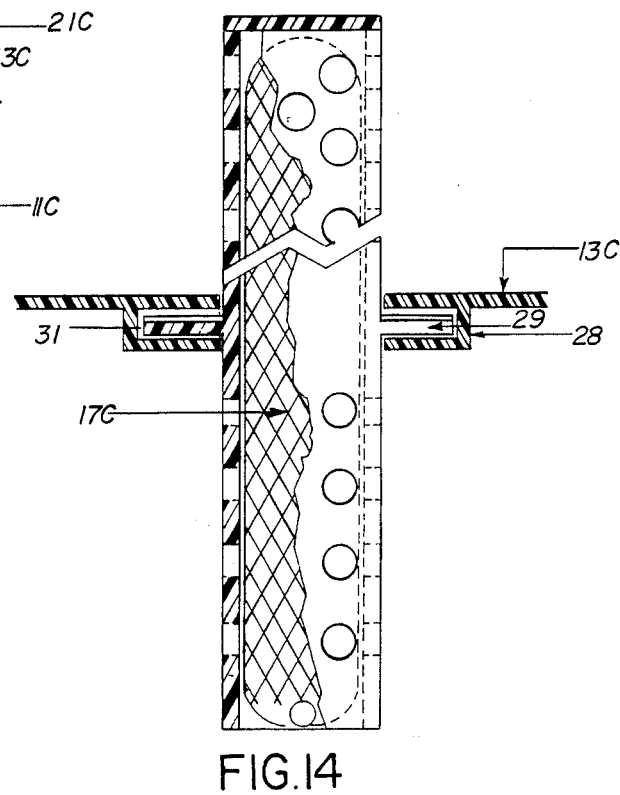
FIG. 14 is a section taken vertically through the irrigating device and its connection with the upper receptacle.
Figure 15:
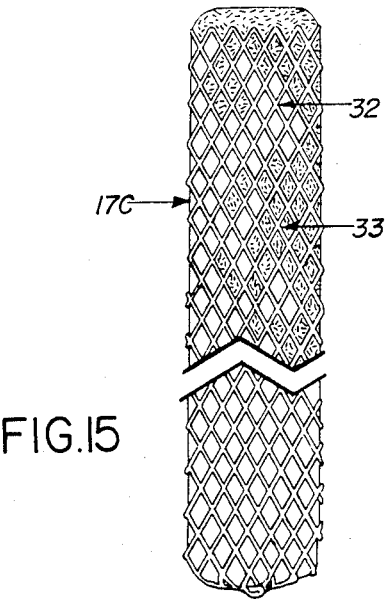

The embodiment of the invention illustrated by FIGS. 12-14 differs from the previously described self-watering plant containers in several respects but corresponding parts are indicated by the same reference numerals distinguished, however, by the suffix additions "C".

One important difference is that the irrigating device 12C is detachably attached to the bottom 13C of the upper receptacle 10C. For that purpose, a boss 28 on the undersurface of the bottom 13C surrounds the irrigating device 12 which, between its ends, is provided with diametrically opposed lugs 29 when the upper end of the irrigating device 12C is properly positioned in the upper receptacle 10C and which open into a chamber 31 thereby enabling the irrigating device 12C to be turned into a position in which it is secured to the receptacle 10C or as easily detached therefrom by turning the device 12C in the opposite direction. The device 12C is a close fit in the bottom of the receptacle 10C and the bayonet type of joint between the boss 28 and the irrigating device 12C is established without permitting dirt to escape from the receptacle 10C. While the irrigating device 12C is connected to the upper receptacle 10C before the latter is filled with dirt, after a period of use the soil is sufficiently moist so that if the irrigating device 12C is removed for any reason, a cavity remains enabling the irrigating device to be easily reinserted.

Another important difference is that the wick element 17C is shown as consisting of an open mesh, fabric sleeve 32 so filled with cotton 32 that the wick element 17C is sufficiently self-supporting to enable it to be inserted in and to extend from end to end of the perforated tube 16C, the sleeve 32 being so dimensioned that when thus filled, the wick member 17C is a snug fit therein.

It is preferred and as shown that the reservoir 11C have an area substatially greater than that of the bottom of the upper receptacle 10C in order that the reservoir can be shallow and still have adequate capacity so that the reservoir establishes a base of minimum height. The bottom 13C of the upper receptacle is the cover of the reservoir and is shown as having a filling port having a removable closure 21C.

I claim:

1. A self-watering plant container, said container including a lower receptacle which is a reservoir having an open mouth, an upper receptacle, the bottom and mouth of said reservoir of a cross sectional area substantially greater than the maximum cross sectional area of the upper end of the upper receptacle and the bottom of said upper receptacle including an integrally connected surrounding flange shaped and dimensioned to overlie the open mouth of the reservoir and be supported by the rim thereof as a detachable cover, the height of said reservoir substantially less than the height of said upper receptacle, and the relationship between the height of the upper receptacle and the reservoir and the two cross sectional areas ensuring that the reservoir constitutes a stable base for the container even with the reservoir empty, and an irrigating device effecting communication between said reservoir and said upper receptacle, said device including a perforated wick member which is self-supporting at least when dry and a tube in which the wick member is a snug fit, at least when saturated, means detachably connecting said tube to the bottom of said upper receptacle and extending at least upwardly a substantial distance into said upper receptacle and said wick member extending the full length of said tube and downwardly into the reservoir adjacent to the bottom thereof.

2. The self-watering plant container of claim 1 in which the connecting means includes complemental portions establishing a bayonet type of joint portion of which are exposed to the undersurface of the bottom of the upper receptacle.

3. The self-watering plant container of claim 1 and a servicing stand including a base and a support dimensioned to provide a temporary seat for the upper receptacle and spaced above the base a distance greater than the length of the downwardly extending portion of the tube, and the support has a hole dimensioned freely to accommodate said tube portion.

* * * * *